(12) United States Patent
Silva

(10) Patent No.: US 8,887,407 B2
(45) Date of Patent: Nov. 18, 2014

(54) PROPELLER BLADE SEAL POSITIONING GAUGE

(71) Applicant: Maricela Carlota Silva, San Antonio, TX (US)

(72) Inventor: Maricela Carlota Silva, San Antonio, TX (US)

( * ) Notice: Subject to any disclaimer, the term of this patent is extended or adjusted under 35 U.S.C. 154(b) by 194 days.

(21) Appl. No.: 13/746,264

(22) Filed: Jan. 21, 2013

(65) Prior Publication Data

US 2013/0230387 A1 Sep. 5, 2013

Related U.S. Application Data

(60) Provisional application No. 61/606,874, filed on Mar. 5, 2012.

(51) Int. Cl.
*G01B 11/27* (2006.01)
*F01D 11/00* (2006.01)
*B64F 5/00* (2006.01)

(52) U.S. Cl.
CPC ............ *F01D 11/001* (2013.01); *B64F 5/0009* (2013.01)
USPC .............................................. 33/613; 33/562

(58) Field of Classification Search
USPC .......................................... 33/562, 613, 645
See application file for complete search history.

(56) References Cited

U.S. PATENT DOCUMENTS

| | | | |
|---|---|---|---|
| 2,096,752 A | 10/1937 | Metcalf | |
| 2,528,281 A | 10/1950 | Martin et al. | |
| 2,694,262 A | 11/1954 | Daniel | |
| 2,953,208 A | 9/1960 | O'Connor | |
| 3,327,395 A | 6/1967 | Zenke | |
| 3,504,872 A | 4/1970 | Russell-French | |
| 3,793,731 A * | 2/1974 | Hyyppa et al. | ................ 33/1 PT |
| 4,056,888 A * | 11/1977 | Hughey, Jr. | ...................... 33/530 |
| 4,584,780 A | 4/1986 | Pressey | |
| 5,375,339 A | 12/1994 | Noel, Jr. | |
| 5,454,153 A * | 10/1995 | Noel | ............................ 29/281.1 |
| 5,865,599 A | 2/1999 | Pruden et al. | |
| D420,261 S | 2/2000 | Carter, Jr. | |
| 6,312,223 B1 | 11/2001 | Samuelsson | |
| 6,457,720 B1 | 10/2002 | London | |
| 7,306,497 B2 | 12/2007 | Buzzi | |
| D572,547 S | 7/2008 | Buermann | |
| 7,562,464 B2 * | 7/2009 | Chang | ............................ 33/530 |
| 8,793,856 B2 * | 8/2014 | Werner et al. | ................ 29/407.1 |
| 2002/0095807 A1 * | 7/2002 | Morgan | .......................... 33/530 |
| 2007/0068023 A1 * | 3/2007 | Chang | ............................ 33/530 |
| 2008/0209747 A1 * | 9/2008 | Chang | ............................ 33/530 |

FOREIGN PATENT DOCUMENTS

GB        818858        8/1959

* cited by examiner

*Primary Examiner* — G. Bradley Bennett
(74) *Attorney, Agent, or Firm* — Richard C. Litman

(57) ABSTRACT

The propeller blade seal positioning gauge provides for precisely marking the position(s) of the circumferential seal(s) about the blade shank of a controllable pitch propeller prior to propeller reassembly. The gauge includes an elongate arm having a stop extending from one end normal thereto. The distal portion of the arm is inwardly offset toward the spanwise axis of the blade to place the distal portion of the arm adjacent the blade shank. One or more marker notches are formed in either or both edges of the arm, their locations being precisely determined according to the specific propeller type. The stop is placed upon the butt of the blade and the tip of an appropriate marker is placed in the appropriate notch of the gauge. The device is then rotated about the blade shank to mark a circumferential ring about the shank to indicate the precise position of the seal.

20 Claims, 3 Drawing Sheets

PROPELLER BLADE SEAL POSITIONING GAUGE

CROSS-REFERENCE TO RELATED APPLICATION

This application claims the benefit of U.S. Provisional Patent Application Ser. No. 61/606,874, filed Mar. 5, 2012.

BACKGROUND OF THE INVENTION

1. Field of the Invention

The present invention relates to tools, gauges, fixtures, and the like for use in the aerospace industry, and particularly to a propeller blade seal positioning gauge for marking the locations of the circumferential seals for installation on the shank of a controllable pitch propeller blade prior to reassembly of the propeller.

2. Description of the Related Art

Propellers for large and complex aircraft are constructed with blades that can rotate axially within their sockets in the propeller hub or barrel, as the hub may be known in larger propeller assemblies. This allows the angle or pitch of the blades to be adjusted for different flight conditions, e.g., flatter pitch for greater engine RPM at slower speeds for takeoff, and coarser pitch for relatively lower RPM at higher airspeeds, as in cruise flight. The propellers of most turboprop-powered aircraft may also be adjusted into what is known as "beta" mode, i.e., a negative angle of attack, for aerodynamic braking after landing in order to shorten the landing distance.

The blade and hub assembly requires lubrication and seals for the lubrication. In addition, the actual control of the angular blade positions in the hub or barrel is controlled by hydraulic fluid pressure in many engine and propeller types and configurations. The seals about the shanks of the propeller blades must be positioned precisely due to the centrifugal forces that tend to throw the lubrication from the propeller hub. The relatively short length of the shank of the propeller, which mates with the short passage or receptacle in the propeller hub or barrel, results in extremely large mechanical, centrifugal, and aerodynamic forces acting through this relatively small interface between the blade and hub or barrel.

Accordingly, the installation of propeller shank seals is an exacting task that requires great care and patience. For example, it has been found in U.S. Navy propeller overhaul shops and aircraft intermediate maintenance facilities (AIMD) that it can require one-half a day or more just to mark the proper positions or locations for the seals on the shanks of four or more propeller blades for installation in a single propeller hub or barrel, or an hour or more for each blade. Additional time must be allowed for the adhesive to cure, which may extend to 24 hours or more. Yet, to this point there has not been a tool or gauge developed to assist in this task, even though a number of different tools, gauges, fixtures, and the like have been developed in the past for other propeller maintenance and repair operations.

Thus, a propeller blade seal positioning gauge solving the aforementioned problems is desired.

SUMMARY OF THE INVENTION

The propeller blade seal positioning gauge comprises an elongate arm having a propeller blade butt stop or catch extending from one end normal to the adjacent portion of the arm. The arm is curved for clearance of the flange that extends radially from the butt of the propeller blade. At least one marker guide notch or inset is formed in at least one edge of the distal portion of the arm. The inset is adapted to receive the point or tip of a marking device, such as a china marker or grease pencil. The longitudinal position of the inset from the hook or catch of the guide is determined precisely according to the proper location or position of the seal to be installed about the propeller shank.

The gauge is used by placing the stop or catch upon the butt end of the propeller blade so that the arm extends along the adjacent shank of the blade and in close contact therewith. The tip of the marking device is then placed in the appropriate notch, as required, and the gauge is rotated about the spanwise axis of the blade. The marking device follows in its inset guide notch of the gauge, thereby producing a circumferential line at precisely the proper location to indicate the position for installing the seal about the propeller shank.

The gauge is constructed specifically for a certain make and model of propeller blade, as each propeller make and model will require the blade shank seals to be positioned differently from other propeller types. Most larger propellers require two or more seals about the shank of each blade, and the gauge may be formed with such multiple notches as may be required, depending upon the propeller type. The notches may be formed along both of the opposed edges of the distal portion of the arm of the gauge to allow the gauge to be rotated in either direction about the butt of the blade, depending upon the desires of the technician performing the operation, i.e., whether the technician is left-handed or right-handed. Alternatively, opposite edges of the distal portion of the gauge may be provided with different notch spacing to provide for seal marking on two different makes and models of propellers, if desired.

The gauge may be formed of a number of different materials. Acrylic or other plastic is preferred in order to avoid marring the relatively soft aluminum material from which most propellers are formed. Alternatively, the gauge may be made of such metals as aluminum, brass, or steel, so long as appropriate care is taken to avoid marring the propeller shank when harder metals are used.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
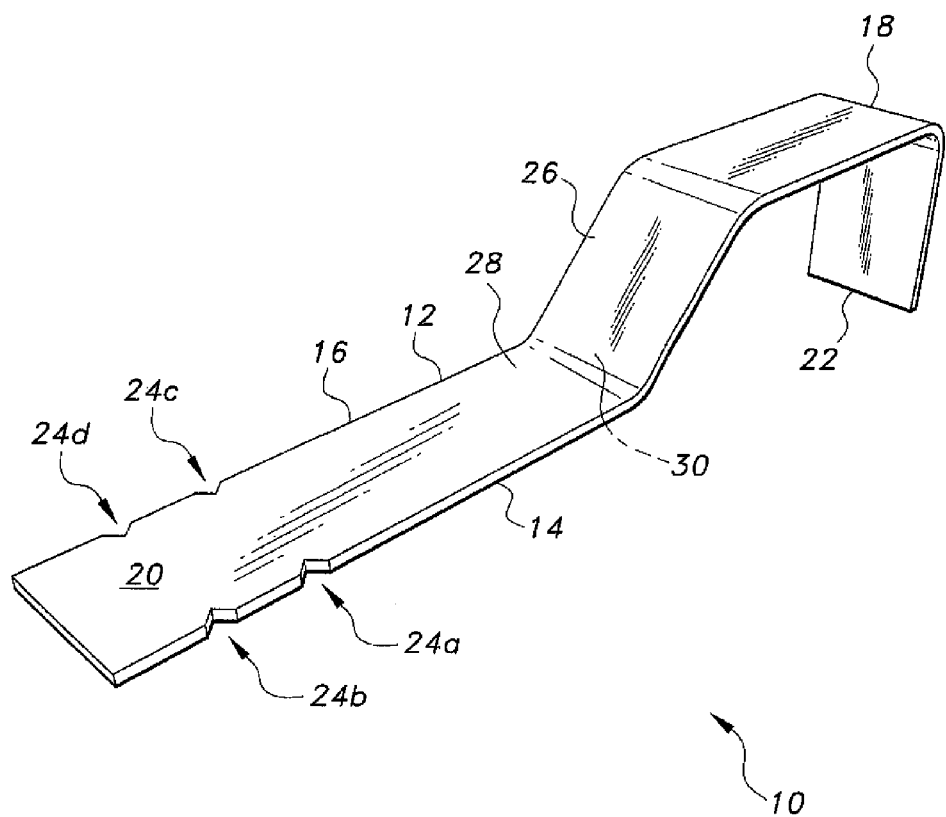
FIG. 1 is a perspective view of a propeller blade seal positioning gauge according to the present invention, showing various features and details thereof.
Figure 2:
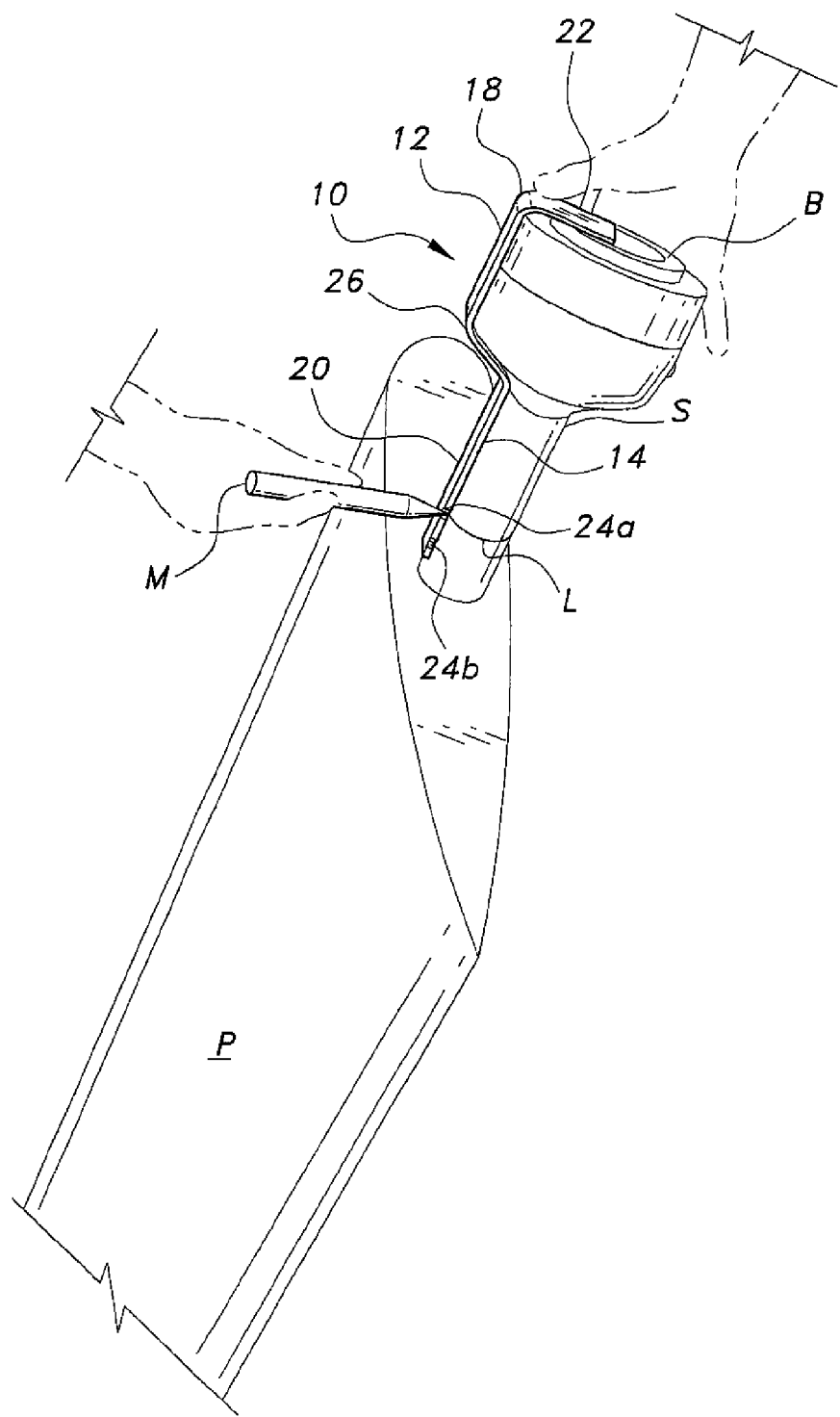
FIG. 2 is an environmental, perspective view of a propeller blade seal positioning gauge according to the present invention, showing the gauge positioning relative to the root, shank, and butt of a propeller blade.
Figure 3:
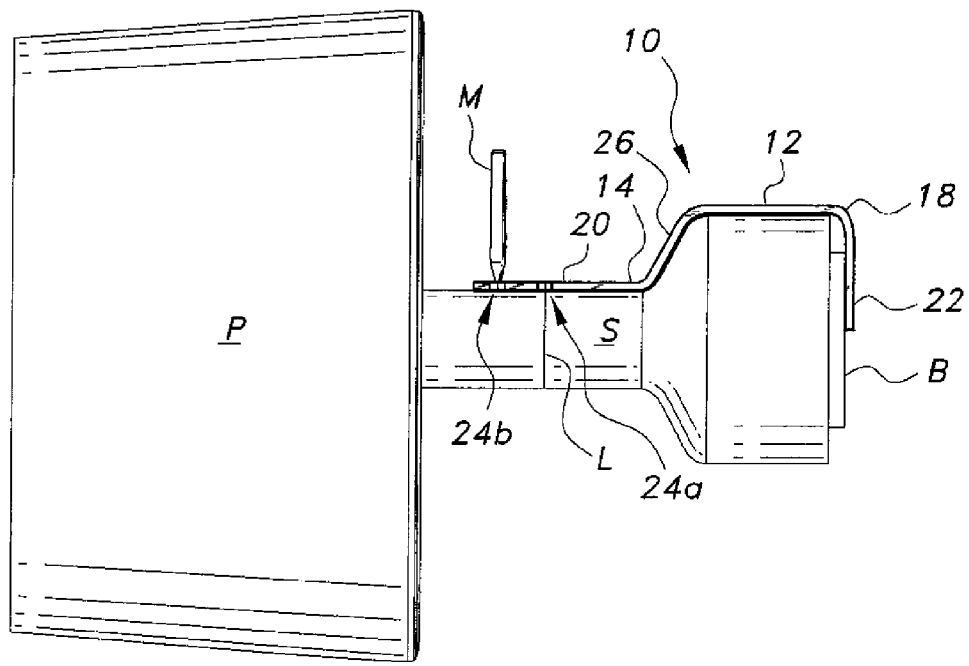
FIG. 3 is an environmental side view of a propeller blade seal positioning gauge according to the present invention, showing the gauge placed over the butt and shank of a propeller.

The propeller blade seal positioning gauge provides a quick and easy means for marking the position(s) for installing one or more seals about the shank of a controllable pitch propeller blade prior to reassembly of the blade in its hub or barrel. FIG. 1 provides a perspective view of the propeller blade seal positioning gauge 10, and FIGS. 2 and 3 illustrate use of the gauge 10 in making a seal position mark about the shank S of a propeller blade B. The gauge 10 is formed as an elongate arm 12 having a first edge 14, an opposite second edge 16, a stop end 18, and a marker end portion 20 opposite the stop end 18. A propeller butt stop 22 extends from the stop end 18 of the gauge 10, the propeller butt stop 22 being substantially normal to the plane of the adjacent portion of the arm 12. The marker end portion 20 may be formed from a flat strip of material, or may be curved from edge 14 to edge 16 in an arc that closely conforms to the curvature of the shank S.

The opposite marker end portion 20 of the arm 12 includes at least one seal position marking guide formed in at least one of the edges 14 and/or 16 thereof. The exemplary gauge 10 of FIGS. 1 through 3 has two such guides 24a and 24b disposed in the first edge 14 and two additional guides 24c, 24d in the opposite second edge thereof, as shown in FIG. 1. The guides 24a through 24d may be in the form of V shaped notches, as shown, or other desired shape. Many, if not most, large propellers require two seals installed about the shank S of the propeller blade P. The specific number and position(s) of the seal(s) will depend upon the specific make and model of propeller, according to the manufacturer. In the example illustrated in FIGS. 1 through 3, the shank S of the propeller blade P requires two axially spaced seals, and the gauge 10 has two seal position marking guides 24a and 24b along its first edge 14.

Moreover, the gauge 10 has two additional marking guides 24c and 24d formed in its opposite second edge 16, as shown in FIG. 1. The second edge marking guides 24c and 24d are directly opposite the respective first edge marking guides 24a and 24b, and merely serve to facilitate the use of the gauge 10 when it is rotated about the propeller shank S in a direction opposite to that made when using the first edge marking guides 24a and 24b. This facilitates use of the gauge 10 by both left handed and right handed technicians. However, it will be seen that the gauge 10 requires such marking guides in only one of its edges, and in the case of propellers having only a single shank seal, only a single guide is required. Alternatively, the gauge 10 may be provided with guides along one edge for one propeller make and model, with the opposite edge having guides therein for a different make and model of propeller blade. A further embodiment may include guides for different makes and models of propeller formed in either given edge, with appropriate indication (e.g., indicia, color coding, etc.) being provided for the specific make and model of propeller for which each of the guides is intended.

FIGS. 2 and 3 illustrate the exemplary use of the propeller blade seal positioning gauge 10. Propeller blades are conventionally manufactured with a thick, relatively large flange extending from the end of the shank S. The flange forms the inboard butt end B of the propeller blade P. The butt flange is captured in the hub or barrel of the assembled propeller and serves to transmit centrifugal forces from the propeller blade P to the hub and to transmit axial pitch adjustment forces from the hub mechanism to the propeller blade P. As the diameter of the propeller butt B is larger than that of the shank S with the butt diameter reducing conically to the shank diameter, the gauge 10 must be configured for clearance of the butt B and the conical reduction in diameter, while still placing the marker end portion 20 of the gauge immediately adjacent to the shank S of the propeller blade P. This is accomplished by forming a stagger or offset portion 26 along the arm 12 of the gauge 10, the offset 26 being away from the outer face 28 and toward the inward face 30 of the gauge 10, i.e., in the direction of the butt stop 22 of the gauge 10. Thus, the portion of the arm 12 adjacent to the butt stop 22 is spaced outward from the propeller butt B when the gauge 10 is in place on the propeller blade so that the marker end portion 20 of the gauge is displaced or offset inward to lie immediately adjacent to the propeller blade shank S, as shown in FIGS. 2 and 3 of the drawings.

Thus, as seen in the side view of FIG. 3, the offset is formed by a bridge portion extending at an obtuse angle to the marker end portion 20 of the gauge 10 and a neck portion extending parallel to the marker end portion for a length sufficient to clear the flange. The butt stop 22 extends normal to the neck portion of the offset 26 (the junction of the neck portion and the butt stop 22 defining the stop end 18 of the arm) and extends below the plane of the marker end portion 20 to define an inverted U-shaped offset, the butt stop 22 preferably having a length substantially equal to the radius of the flange.

The propeller blade seal positioning gauge 10 may be formed from any of a number of different materials. Preferably, a relatively rigid plastic material is used in order to avoid scratching or marring the blade shank S. However, other materials may be used, if desired, e.g., aluminum, brass, or even steels of various alloys, so long as appropriate measures are taken to avoid scratching or marring the blade shank S so as to avoid the creation of stress risers along the shank S, e.g., the placement of a piece of cloth between the gauge 10 and its contact points with the propeller blade butt B and shank S. In any event, the material used must have sufficient strength to avoid any substantial bending in order to preclude displacement of the guides 24a through 24d due to deformation of the gauge 10. When the gauge 10 is formed of metal, it may be formed from flat sheet stock, with the dimension or span across the opposite first and second edges 14 and 16 defining a laterally flat surface thereacross as shown in the drawings. Alternatively, the span between the lateral edges 14 and 16 may be curved to at least generally conform to the curvature of the propeller shank S, if desired, although this is not an absolute requirement for the gauge 10.

The gauge 10 is used as shown in FIGS. 2 and 3, by placing the butt stop 22 on the butt B of the propeller blade P with the stop 22 oriented toward the axial center of the butt B and blade P. The marker end portion 20 of the gauge 10 is placed on the shank S of the propeller blade P so that the seal position marking guides 24a through 24d are closely adjacent to the surface of the propeller shank S. One hand is used to hold the butt stop 22 of the gauge 10 on the end of the propeller butt B while the gauge 10 is rotated about the propeller shank S. The tip of an appropriate marker M (e.g., grease pencil or china marker, etc., i.e., a marking material that is not harmful to the metal structure of the blade shank S) is placed in the appropriate guide 24a through 24b.

The gauge 10 is then rotated about the propeller butt B and shank S, the selected guide serving to guide the tip of the marker M in forming a precise circumferential line about the propeller shank S to indicate the exact position for the seal to be installed. In the example of FIG. 2 it will be seen that the tip of the marker M is placed in the guide 24a and used to form a seal positioning line L about the propeller shank S as the gauge 10 is rotated therearound. In the example of FIG. 3 it will be seen that the tip of the marker M has been placed in the second guide 24b, the marker having previously been used in the first guide 24a to form the line L about the propeller blade shank S. Either guide of the laterally separated guide pairs 24a, 24c and 24b, 24d may be used, depending on whether the technician prefers to rotate the gauge clockwise or counterclockwise around the propeller butt B and shank S.

Accordingly, the propeller blade seal position gauge 10 in its various embodiments greatly facilitates the marking of the position(s) of the blade shank seal(s), greatly facilitating their installation on the blade shank S. The ease with which the positions of the seals may be marked on the blade shank results in a significant savings of time in performing this operation. The greater accuracy provided by the gauge 10 eliminates or reduces positional errors in the installation of the seals about the blade shank, thereby eliminating the need for disassembly, realignment of the seals and reassembly of the propeller when an error is made. Such an error can require from a few hours to several days of labor to disassemble and then reassemble the propeller, with corresponding labor costs. The elimination of such errors and the time and labor costs involved in their correction, provide significant increases in efficiency and economy in the typical large propeller maintenance shop when using the propeller blade seal positioning gauge 10.

It is to be understood that the present invention is not limited to the embodiments described above, but encompasses any and all embodiments within the scope of the following claims.

I claim:

1. A propeller blade seal positioning gauge, comprising:
   an elongate arm having a first edge, a second edge opposite the first edge, a stop end, and a marker end portion opposite the stop end;
   a propeller butt stop extending from the stop end of the arm, the propeller butt stop being substantially normal to the arm; and
   at least one seal position marking guide defined in the marker end portion of the arm, along at least one edge thereof.

2. The propeller blade seal positioning gauge according to claim 1, wherein the arm has an inward face and an outward face opposite the inward face, the marker end portion being offset toward the inward face of the arm.

3. The propeller blade seal positioning gauge according to claim 1, wherein the arm is formed of a sheet of material, the first edge and the second edge thereof defining a laterally flat surface thereacross.

4. The propeller blade seal positioning gauge according to claim 1, wherein said at least one seal position marking guide comprises a plurality of seal position marking guides disposed along one edge of the marker end portion of the arm.

5. The propeller blade seal positioning gauge according to claim 1, wherein said at least one seal position marking guide comprises one seal position marking guide disposed along each edge of the marker end portion of the arm.

6. The propeller blade seal positioning gauge according to claim 1, wherein said at least one seal position marking guide comprises a plurality of seal position marking guides disposed along each edge of the marker end portion of the arm.

7. The propeller blade seal positioning gauge according to claim 1 wherein the arm is formed of a material selected from the group consisting of plastic, aluminum, brass, and steel.

8. A propeller blade seal positioning gauge, comprising:
   an elongate arm having a first edge, a second edge opposite the first edge, a stop end, and a marker end portion opposite the stop end, the arm having a bridge portion extending at an obtuse angle to the marker end portion and a neck portion extending substantially parallel to the marker end portion, the neck portion terminating at the stop end, the bridge portion and the neck portion defining an offset adapted to extend over a butt flange at a butt end of a shank of a propeller blade, the marker end portion being adapted for abutting against the shank of the propeller blade;
   a propeller butt stop extending from the stop end of the arm normal to the neck portion toward a plane defined by the marker end portion of the arm; and
   at least one seal position marking guide defined in the marker end portion of the arm along at least one edge thereof.

9. The propeller blade seal positioning gauge according to claim 8, wherein the propeller butt stop is substantially normal to the arm.

10. The propeller blade seal positioning gauge according to claim 8, wherein the arm is formed of a sheet of material, the first edge and the second edge thereof defining a laterally flat surface thereacross.

11. The propeller blade seal positioning gauge according to claim 8, wherein said at least one seal position marking guide comprises a plurality of seal position marking guides disposed along one edge of the marker end portion of the arm.

12. The propeller blade seal positioning gauge according to claim 8, wherein said at least one seal position marking guide comprises one seal position marking guide disposed along each edge of the marker end portion of the arm.

13. The propeller blade seal positioning gauge according to claim 8, wherein said at least one seal position marking guide comprises a plurality of seal position marking guides disposed along each edge of the marker end portion of the arm.

14. The propeller blade seal positioning gauge according to claim 8 wherein the arm is formed of a material selected from the group consisting of plastic, aluminum, brass, and steel.

15. A propeller blade seal positioning gauge, comprising:
   an elongate arm having a first edge, a second edge opposite the first edge, the first edge and the second edge defining a laterally flat surface thereacross, a stop end, and a marker end portion opposite the stop end;
   a propeller butt stop extending from the stop end of the arm; and
   at least one seal position marking guide defined in the marker end portion of the arm along at least one edge thereof.

16. The propeller blade seal positioning gauge according to claim 15, wherein the propeller butt stop is substantially normal to the arm.

17. The propeller blade seal positioning gauge according to claim 15 wherein the arm has an inward face and an outward face opposite the inward face, the marker end portion being offset toward the inward face of the arm.

18. The propeller blade seal positioning gauge according to claim 15, wherein said at least one seal position marking guide comprises a plurality of seal position marking guides disposed along one edge of the marker end portion of the arm.

19. The propeller blade seal positioning gauge according to claim 15, wherein said at least one seal position marking guide comprises one seal position marking guide disposed along each edge of the marker end portion of the arm.

20. The propeller blade seal positioning gauge according to claim 15, wherein the arm is formed of materials selected from the group consisting of plastic, aluminum, brass, and steel.

* * * * *